US012753986B2

(12) United States Patent
Liverman

(10) Patent No.: US 12,753,986 B2
(45) Date of Patent: Oct. 6, 2026

(54) MOUNT FOR FIREARM ASSEMBLY

(71) Applicant: Andrew R. Liverman, New Berlin, WI (US)

(72) Inventor: Andrew R. Liverman, New Berlin, WI (US)

( * ) Notice: Subject to any disclaimer, the term of this patent is extended or adjusted under 35 U.S.C. 154(b) by 300 days.

(21) Appl. No.: 18/679,197

(22) Filed: May 30, 2024

(65) Prior Publication Data

US 2026/0036388 A1 Feb. 5, 2026

(51) Int. Cl.
*F41A 23/18* (2006.01)
*B25B 1/20* (2006.01)
*F41A 11/00* (2006.01)

(52) U.S. Cl.
CPC ............... *F41A 23/18* (2013.01); *F41A 11/00* (2013.01); *B25B 1/20* (2013.01)

(58) Field of Classification Search
CPC ................................... F41A 23/18; B25B 1/20
See application file for complete search history.

(56) References Cited

U.S. PATENT DOCUMENTS

D762,278 S 7/2016 Geissele et al.
9,823,035 B2 11/2017 Geissele et al.
D989,218 S 6/2023 Cheng et al.

FOREIGN PATENT DOCUMENTS

CA 2709053 A1 * 1/2012 ............. F41A 31/00

* cited by examiner

*Primary Examiner* — Jason L Vaughan
*Assistant Examiner* — Amanda Kreiling
(74) *Attorney, Agent, or Firm* — James Earl Lowe, Jr.

(57) ABSTRACT

A mount for a firearm assembly, the mount being configured to be secured in another support mechanism, such as a vise. The mount comprising a bottom support member, a front piece having a front buffer tube receiving portion held by the bottom support member, and a back piece spaced apart from the front piece and having a back buffer tube receiving portion held by the bottom support member. The front piece is at the front end and the back piece is at but spaced apart from the back end. A space between the sides of the bottom support member at the back end is adapted to receive a firearm rear pistol grip adapter.

15 Claims, 12 Drawing Sheets

MOUNT FOR FIREARM ASSEMBLY

BACKGROUND

This disclosure pertains to a firearm mount configured to secure a firearm in a desired position and orientation during assembly or adjustment. The mount is configured to be secured in another support mechanism, such as a vise.

A problem associated with firearm maintenance and assembly is the difficulty of steadying the firearm in an orientation suited to the maintenance or assembly being performed. Firearms often contain small components in hard-to-reach places. Removing, installing, adjusting, fixing, or otherwise manipulating such components can present a challenge because of the components' size and location within the firearm. The task can be simplified if the firearm is arranged in the right position and orientation, but getting and keeping the firearm there can be challenging. Further, part of the firearm assembly requires the torquing of a castle nut against an end plate. Since some 40-foot pounds of torque are required, it is difficult to steady the firearm while torquing the castle nut.

SUMMARY

Disclosed is a mount for a firearm assembly, the mount being configured to be secured in another support mechanism, such as a vise. The mount comprises a bottom support member, a front piece having a front buffer tube receiving portion held by the bottom support member, and a back piece spaced apart from the front piece and having a back buffer tube receiving portion held by the bottom support member. The front receiving portion has a front buffer tube receiving opening adapted to receive a firearm buffer tube. The back receiving portion has a back buffer tube receiving opening adapted to receive the firearm buffer tube, with each buffer tube receiving opening having at least one recess forming a buffer tube flange receiving opening. The bottom support has a front end and a back end, and the front piece is at the front end and the back piece is at but spaced apart from the back end. A space between the sides of the bottom support member at the back end is adapted to receive a firearm rear pistol grip adapter.

FIG. 1 illustrates an example of a conventional firearm assembly and adjustment mount 100 in use with a firearm 120 and a support mechanism 144. The firearm assembly and adjustment mount 100 generally includes a firearm engagement portion 102 and a support member 104 extending from the firearm engagement portion 102. The firearm engagement portion 102 of the firearm assembly and adjustment mount 100 includes a hollow body 106 including an inner surface 108 and an outer surface 110.

The firearm engagement portion 102 is configured to receive and engage with a portion of a firearm for the purpose of supporting the firearm 120 in a desired position and orientation. In this example the firearm engagement portion 102 includes a hollow body 106 having an inner surface 108 and an outer surface 110. An interior space is formed between the inner surface 108 into which a portion of the firearm 120 is received and secured.

The support member 104 is connected to and extends from the firearm engagement portion 102 and has outer surfaces that are sized and shaped to be secured to a support 144 such as, for example, a vise 145 or a clamp. In one possible configuration, the support member 104 is a rectangular protrusion that is suitably long, wide and thick to be secured in the jaws of a vise.

As discussed above, the firearm assembly and adjustment mount 100 operates to support a firearm 120 in a desired position and orientation. An example of a firearm 120 is illustrated in FIG. 1. In this example, the firearm 120 includes a receiver assembly 122, a barrel assembly 124, and a handguard assembly 126.

The firearm 120 is a gun configured to discharge a projectile. Several examples of the firearm 120 include a handgun, a rifle, a shotgun, a musket, a carbine, a machine gun, a submachine gun, an air gun, and a paintball gun. More specific examples of firearms 120 that can be secured using the firearm assembly and adjustment mount 100 include an AR-15, M-16, or M-4 type rifle, or one of their variants.

The receiver assembly 122 is a part of the firearm that houses the operating parts, such as the firing mechanism and associated components. In some embodiments the receiver assembly 122 includes a spring-biased hammer that is cocked and then released by a sear upon actuating a trigger mechanism. The hammer strikes a firing pin carried by a bolt, which in turn is thrust forward to contact and discharge a cartridge loaded in a chamber. A portion of the expanding combustion gases traveling down the barrel is discharged off and used to drive the bolt rearward against a forward biasing force of a recoil spring for automatically ejecting the spent cartridge casing and automatically loading a new cartridge into the chamber from a magazine when the bolt returns forward. In at least one embodiment, the receiver assembly 122 includes an upper receiver 128 and a lower receiver 130.

The upper receiver 128 defines an internal longitudinally extending cavity configured to receive a bolt assembly. The bolt assembly is slidably disposed in the cavity for axially reciprocating recoil movement therein. In at least one embodiment, the upper receiver 128 is an AR-15, M-16 or M-4 type upper receiver, or one of their variants.

The lower receiver 130 includes a buffer tube 132, a handgrip 134, a trigger mechanism 136, and a magazine well 138. The buffer tube 132 is situated behind the firing chamber and reduces the recoil of the firearm caused by the motion of the firing bolt assembly during firing. Such a buffer tube is typically mounted to the receiver of the firearm. In this example buffer tube 132 includes a cylindrical portion 140, and a flange 142. In some embodiments the buffer tube 132 also includes a buffer pin, a buffer spring for recoil reduction, as well as a castle nut and an endplate. In at least one embodiment, the lower receiver 130 is an AR-15, M-16 or M-4 type lower receiver, or one of their variants.

The vise 145 generally includes a base 146, jaws 148, and a crank 150. The base 146 is typically secured to a work surface during operation of the vise 145. In this example, the jaws 148 hold the support member 104 of the example firearm assembly and adjustment mount 100. The crank 150 is used to rotate a screw that moves the jaws 148 closer together or farther apart, thereby allowing the vise 145 to alternatively secure or release the firearm assembly and adjustment mount 100.

The firearm assembly and adjustment mount 100 is shown housing a partially assembled lower receiver 160 of the firearm 120 in a first orientation. The partially assembled lower receiver 160 includes the buffer tube 132 with its cylindrical portion 140, and a rear portion 161. The rear portion 161 of the lower receiver 160 includes an upper portion 162, a threaded portion 163, and a lower portion 164. The buffer tube 132 includes screw threads 166. Also in this example, the hollow body 106 includes multiple recesses 167, such as recesses 168, 170, 172, and 174.

In this example of the lower receiver 160, the screw threads 166 screw into a corresponding threaded portion 163 of the rear portion 161 of the lower receiver 160 to secure the buffer tube 132 to the rear portion 161.

Figure 1:
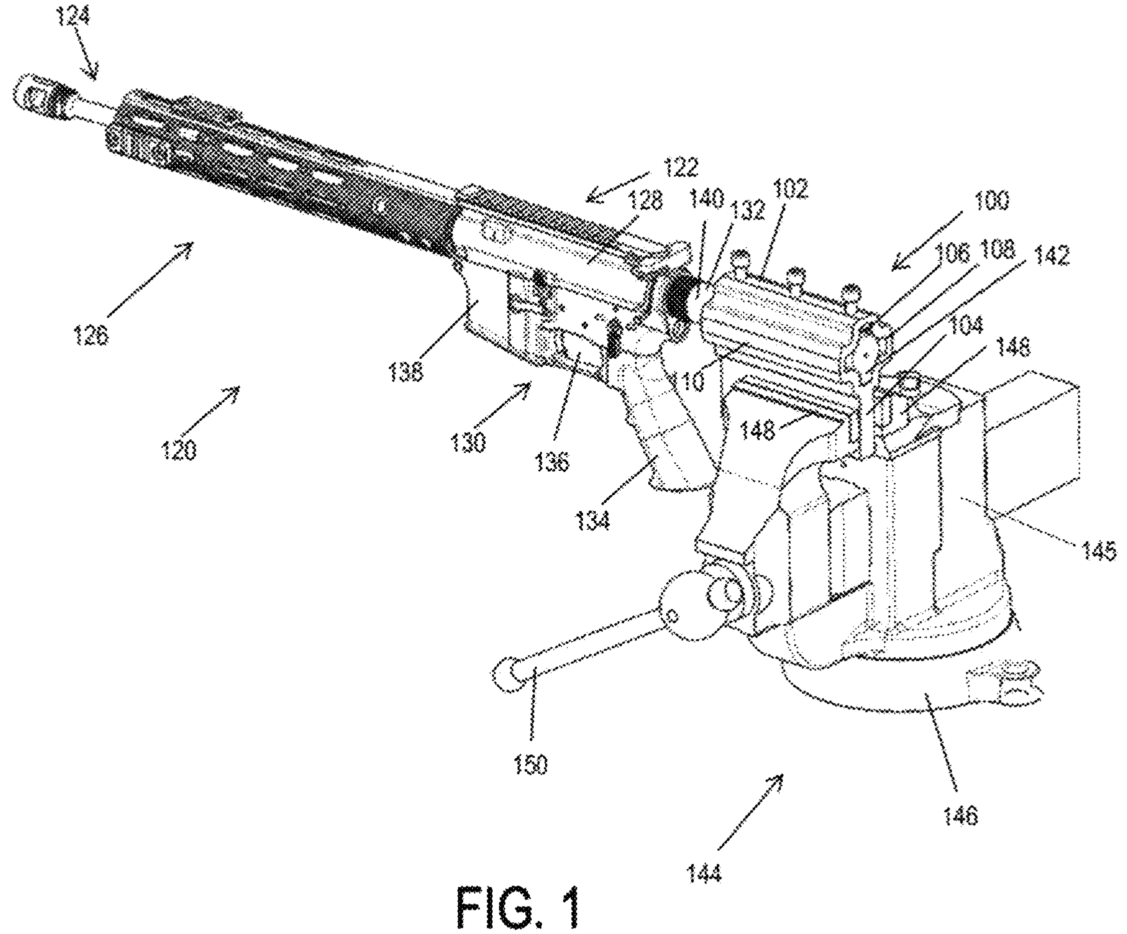
FIG. 1 PRIOR ART
FIG. 1 illustrates a conventional firearm assembly and adjustment mount in use with a firearm and a support mechanism.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT

Figure 10:
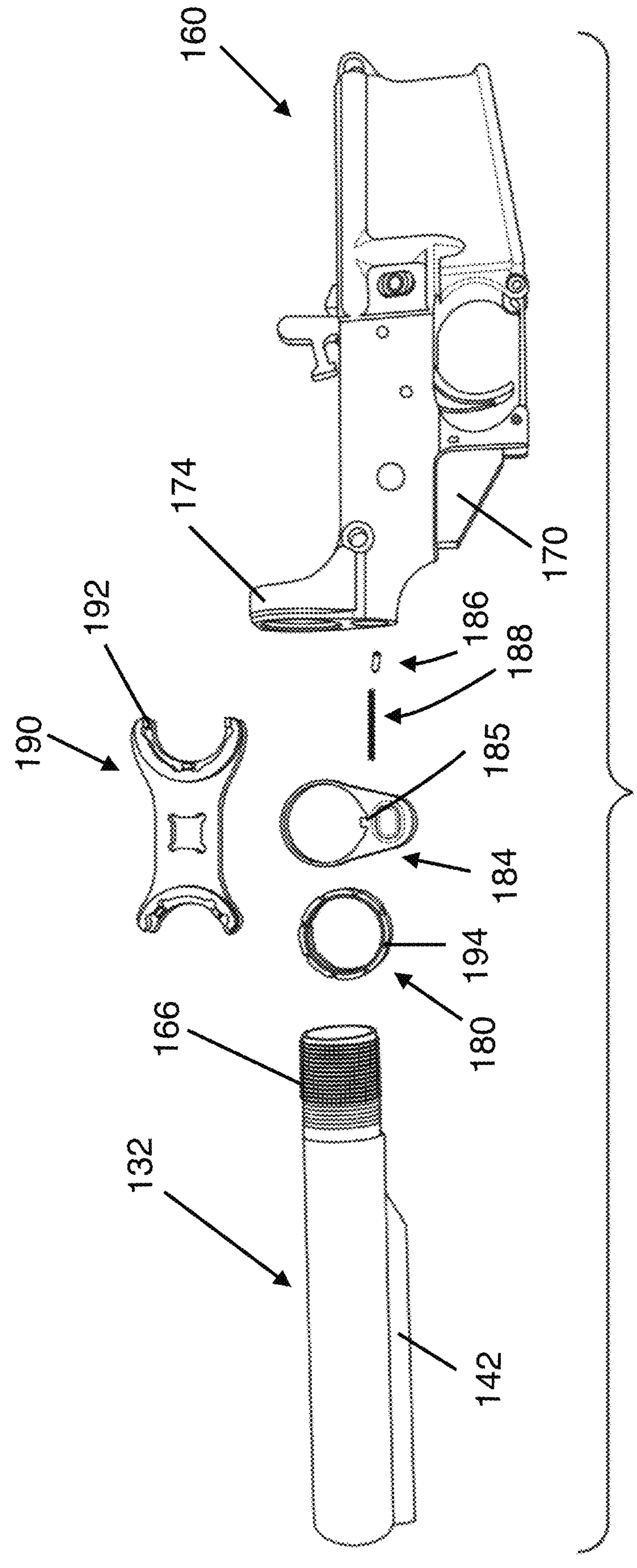
FIG. 10 is a top exploded view of the parts for an assembly of a lower receiver and buffer tube of a firearm, along with a castle nut wrench.

As illustrated in FIGS. 2-9, and 11 and 12, disclosed is a mount 10 for a firearm assembly 122. The firearm assembly 122, as illustrated in FIGS. 1 and 10, includes a lower receiver 130 comprising a rear pistol grip adapter 170, as shown in FIG. 10, and a front buffer tube receiver extension 174, and a buffer tube 132 having a longitudinal cylindrical portion 140 and a buffer tube radially extending flange 142.

The mount 10 includes a bottom support member 36, a front piece 14 having a front buffer tube receiving portion 18 held by the bottom support member 36, and a back piece 26 spaced apart from the front piece 14 and having a back buffer tube receiving portion 30 held by the bottom support member 36

Figure 2:
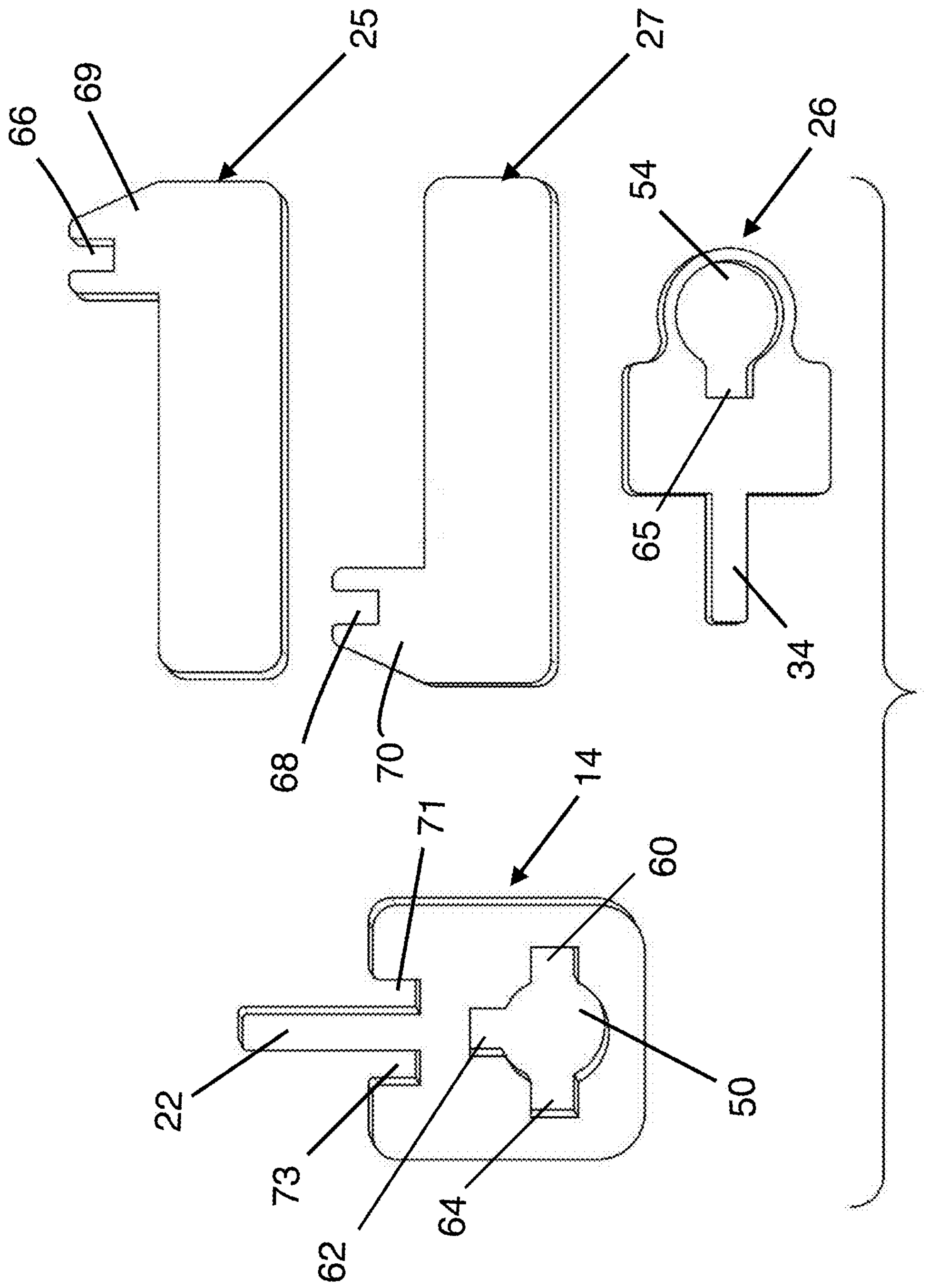
FIG. 2 is a top view of four independent pieces that form an improved mount for a firearm according to this disclosure.

As shown in FIG. 2, the front receiving portion 18 has a circular front buffer tube receiving opening 50 adapted to receive the buffer tube 132, and the back receiving portion 30 has a circular back buffer tube receiving opening 54 adapted to receive the buffer tube 132. Each of the buffer tube receiving openings 50 and 54 have at least one recess forming a buffer tube flange receiving opening. More particularly, the front buffer tube receiving opening has opposed horizontally extending recesses 60 and 64, a downwardly extending recess 62, and the back buffer tube receiving opening has a downwardly extending recess 65. The transition between the circular back buffer tube receiving opening 54 and the downwardly extending recess 65 is beveled for easing movement of the back piece along the buffer tube 132.

Figure 3:
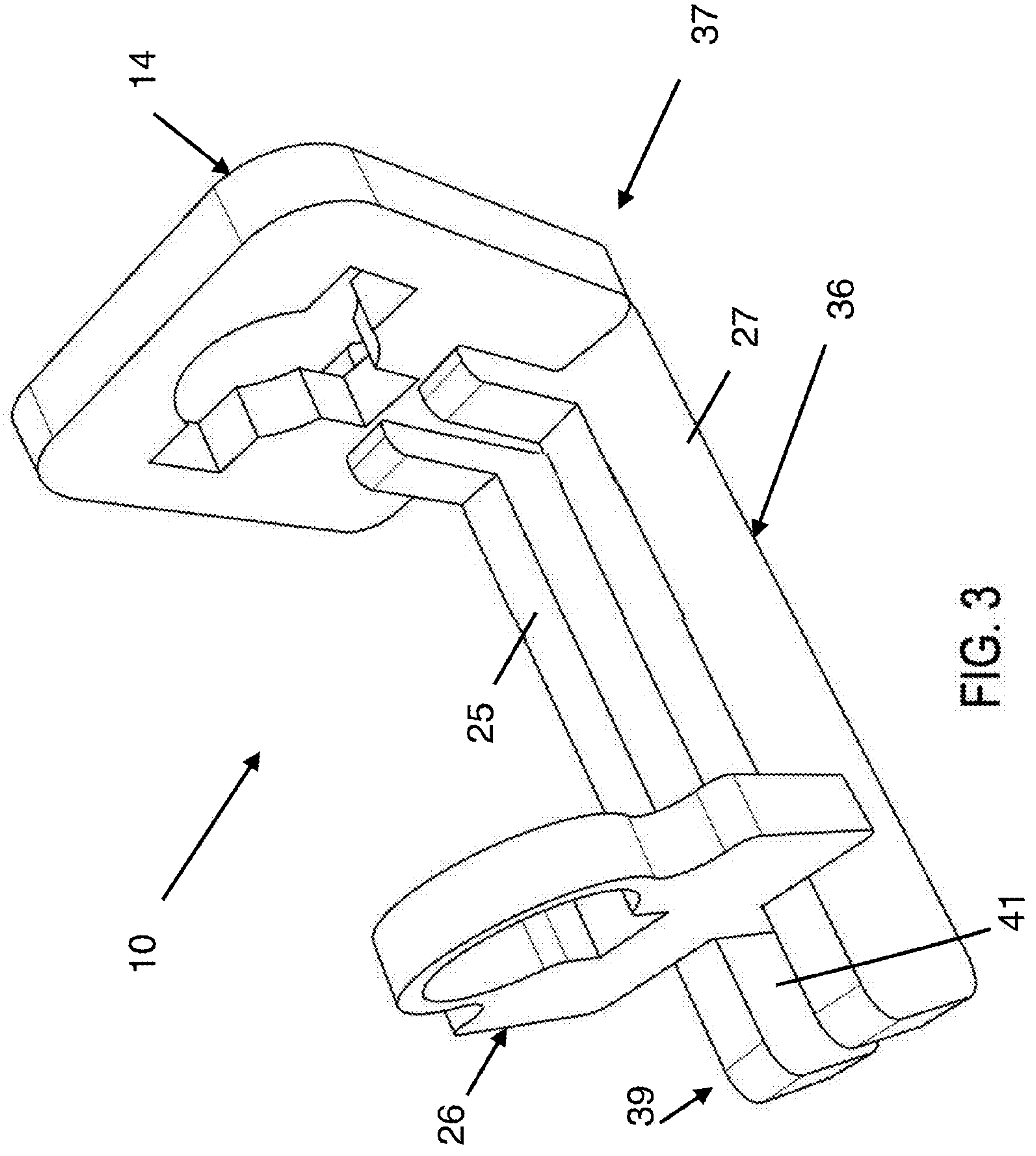
FIG. 3 is a perspective view of the four pieces of FIG. 2 assembled into the improved mount.
Figure 4:
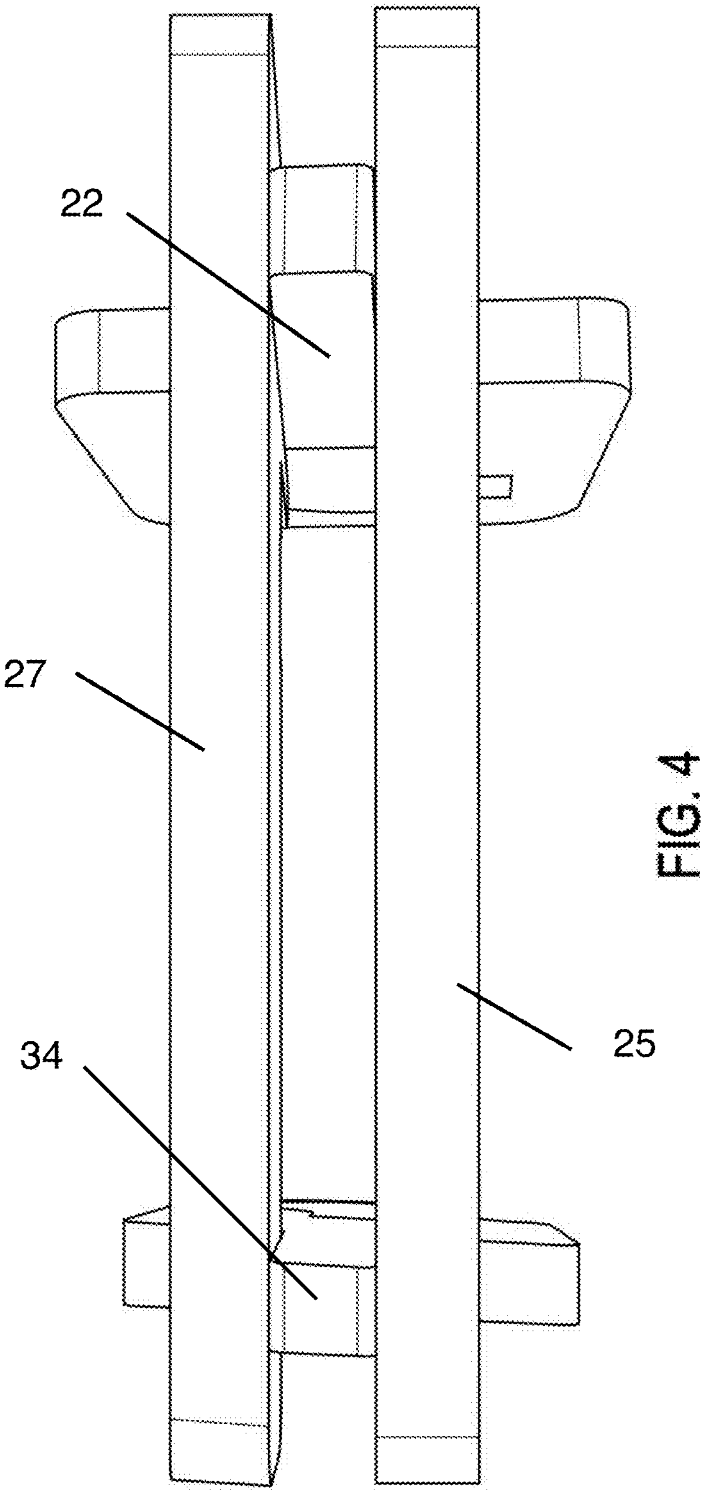
FIG. 4 is a bottom view of the improved mount.
Figure 5:
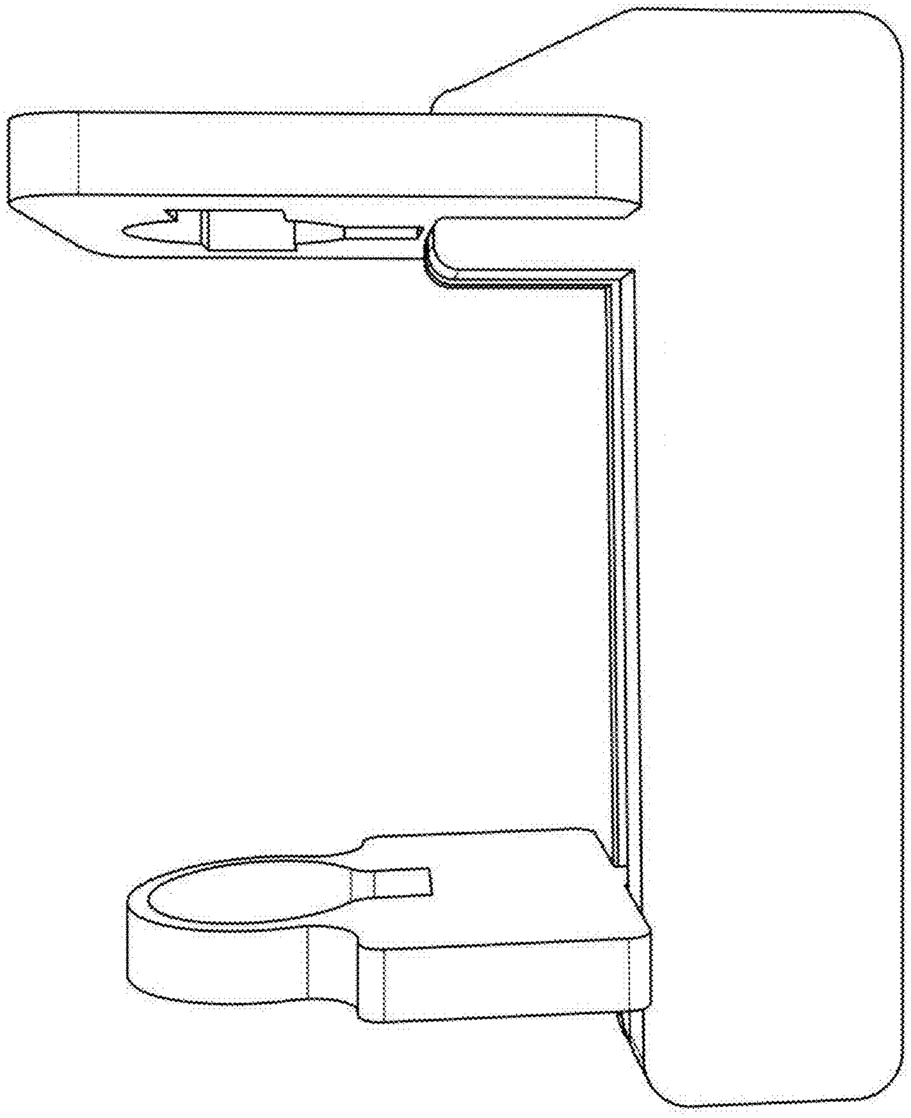
FIG. 5 is a right-side view of the improved mount.
Figure 6:
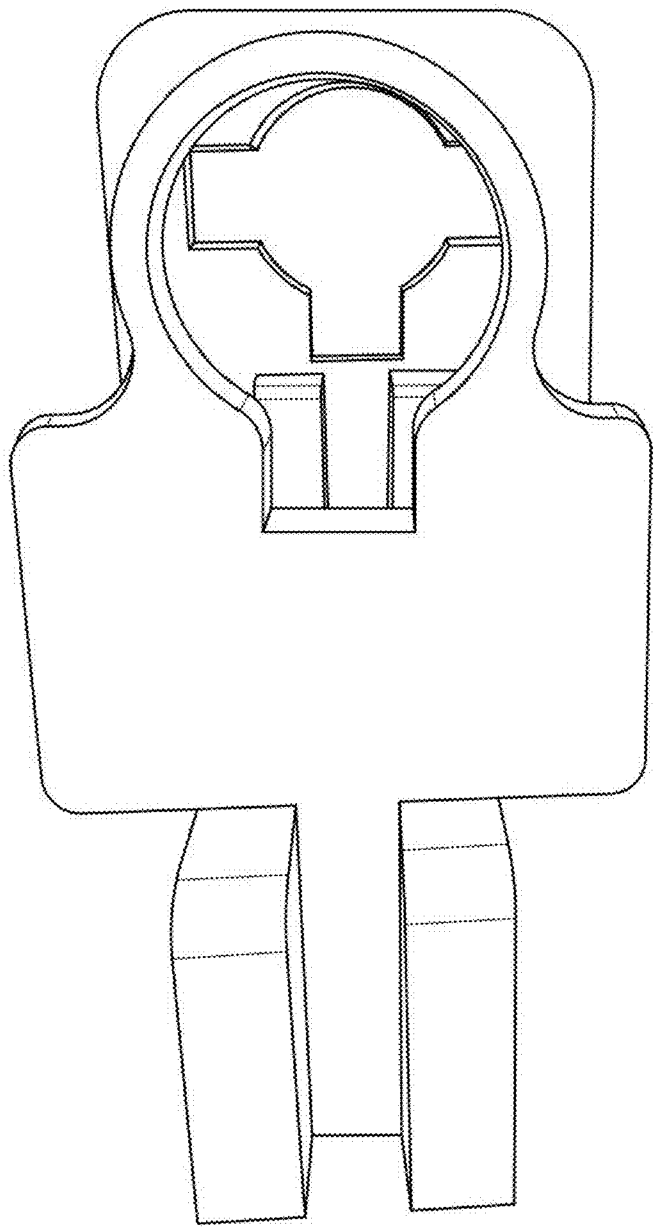
FIG. 6 is a rear view of the improved mount.
Figure 7:
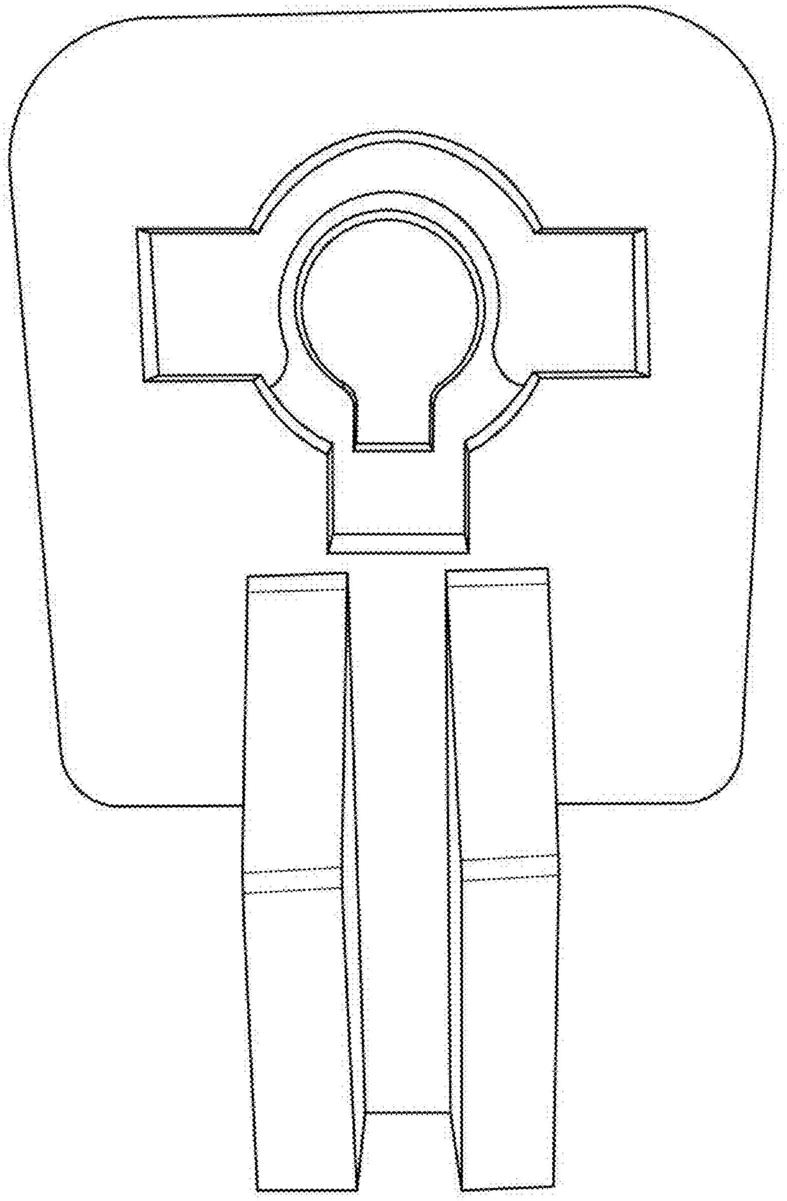
FIG. 7 is a front view of the improved mount.
Figure 8:
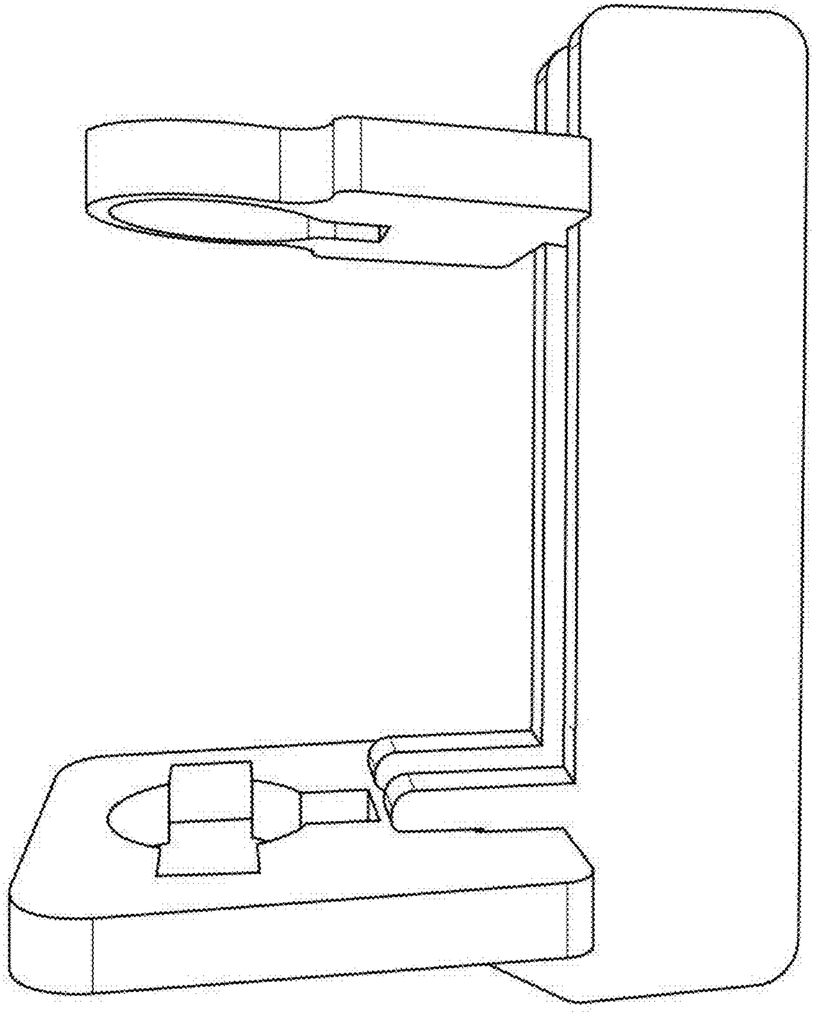
FIG. 8 is a left side view of the improved mount.
Figure 9:
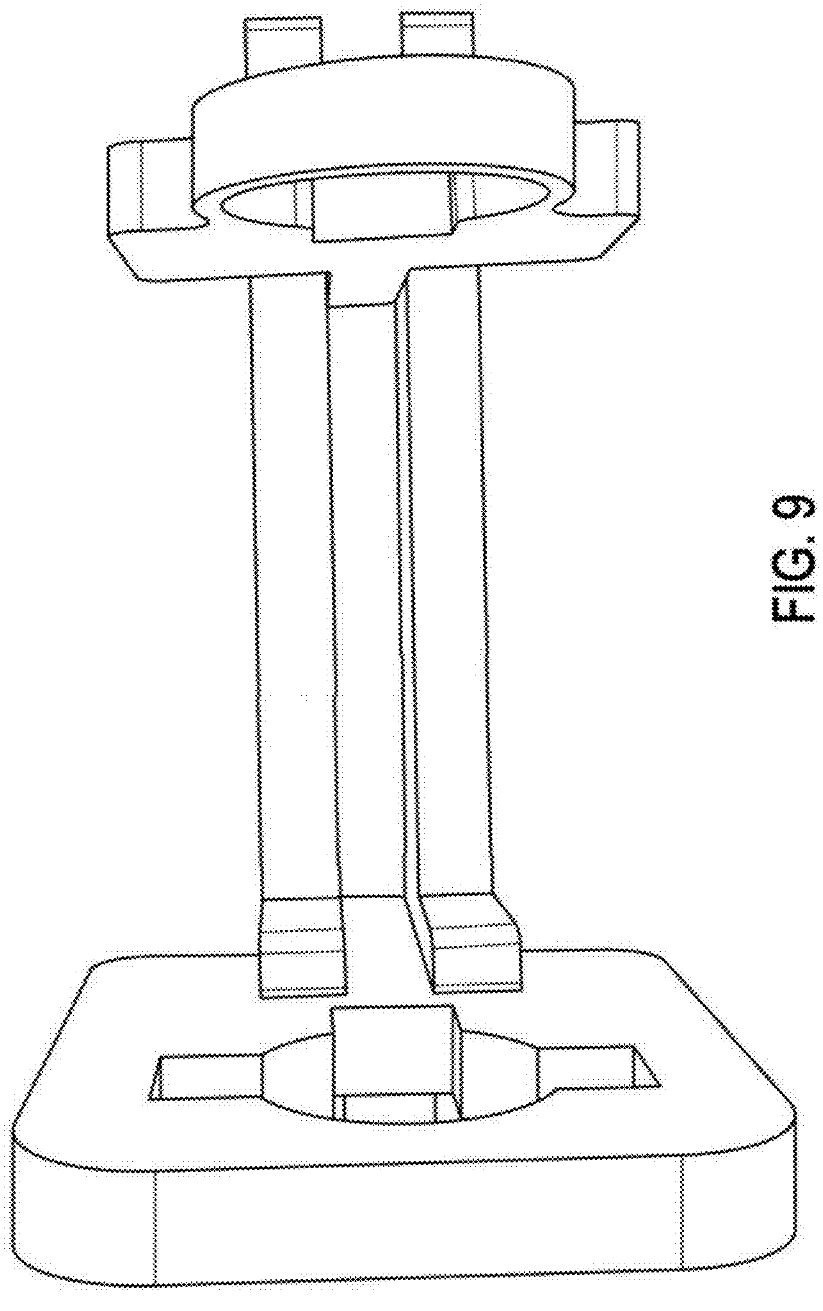
FIG. 9 is a top view of the improved mount.

As shown in FIG. 3, the bottom support member 36 has a front end 37 and a back end 39, the front piece 14 being at the front end 37 and the back piece 26 being at but spaced apart from the back end 39. A space 41 is between the sides of the bottom support member at the back end 39 so that the back end 39 is adapted to receive the rear pistol grip adapter 170.

In the preferred embodiment, as shown in FIGS. 2 and 3, the bottom support member comprises two spaced apart side plates 25 and 27, and the mount 10 comprises four independent planar pieces made from sturdy plastic. More particularly, the planar pieces are plastic and made from ABS (Acrylonitrile Butadiene Styrene). In other less preferred embodiments, the planar pieces can be made from metal, such as aluminum. An advantage of using ABS is that it is less likely to mar the firearm, especially when staking a castle nut 180 to an end plate 184, as described below. The four independent pieces, as shown in FIG. 2, include the two spaced apart side plates 25 and 27, the front piece 14 and the back piece 26. Independent planar pieces as used herein means the four parts are individual pieces separate from each other, as manufactured.

Figure 12:
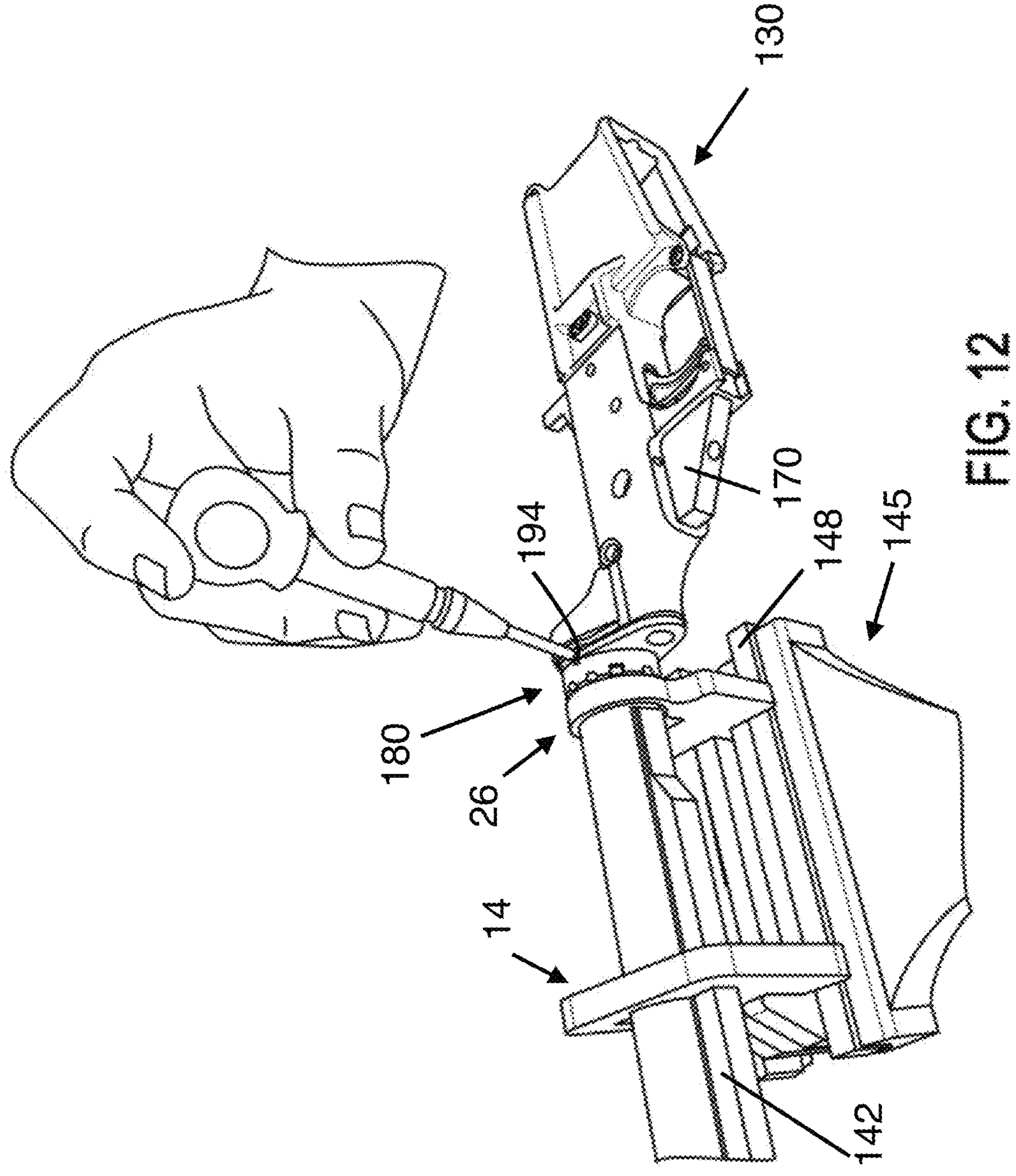
FIG. 12 illustrates the mount of this disclosure in use with a firearm and a support mechanism, with the firearm positioned for the staking of the end plate to the castle nut.

The front piece 14 has a front buffer tube receiving portion 18 and a front leg 22, part of which is located between the two spaced apart side plates 25 and 27, and the back piece 26 spaced apart from the front piece 14 and having a back buffer tube receiving portion 30 and a back leg 34, part of which is located between the two spaced apart side plates 25 and 27. In the preferred embodiment, the back piece 26 is movable along the spaced apart side plates 25 and 27. This permits the mount 10 to accommodate various castle nut wrench sizes, eases the placing of the buffer tube 132 into the mount 10, and permits ready placement of the back piece 26 adjacent a castle nut 180, as shown in FIG. 12, for staking the castle nut 180 to an end plate 184.

In the preferred embodiment, the spaced apart side plates 25 and 27 have side plate notches 66 and 68, respectively, therein that receives the front firearm engaging portion 18. In the preferred embodiment, each notch 66 and 68 is formed in a respective outward extension 69 and 79 in each side plate, the outward extensions together supporting the front piece 14 so it cannot rotate or move along the support member 36. Front piece notches 71 and 73 receive the outward extensions to aid in supporting the front piece 14.

In less preferred embodiments (not shown), the support member 36 can be one piece with the front piece and back piece attached thereto, with a notch forming space in the back end of the support member adapted to receive the rear pistol grip adapter.

In the preferred embodiments, the front and back pieces 14 and 26 are held by the side plates 25 and 27 when the side plates are clamped in a vise 145. Prior to being clamped, the back piece 26 can be positioned between the side plates 25 and 27 in a desired position, such as by a castle nut wrench

Figure 11:
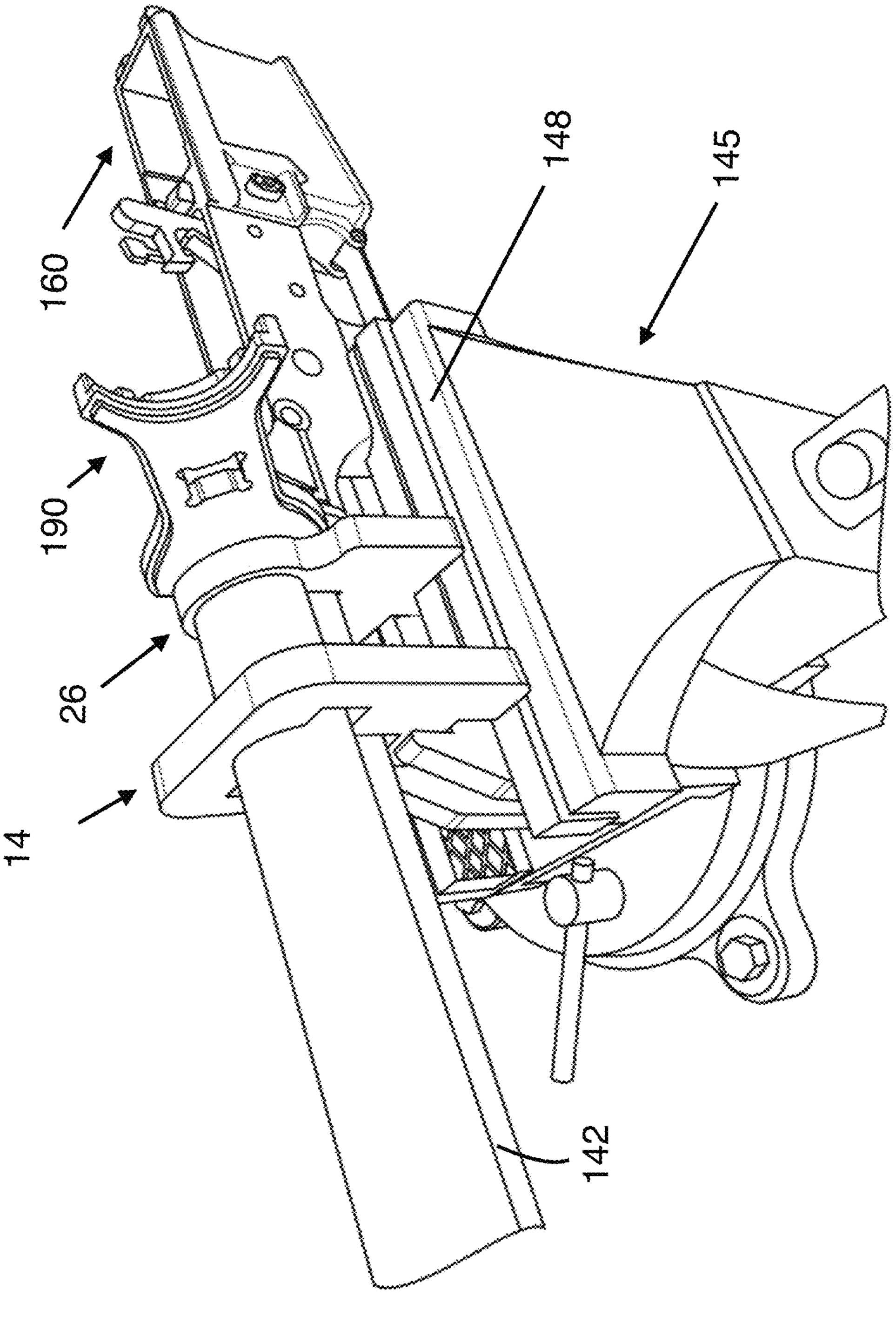
FIG. 11 illustrates the mount of this disclosure in use with a firearm and a support mechanism, with a castle nut wrench for tightening the castle nut.

190 for torquing a castle nut 180, as shown in FIG. 11, or by the castle nut 180 when staking the end plate to the castle nut 180, as shown by FIG. 12.

Part of the assembling of the firearm 120 requires the threading of the buffer tube 132 into the front buffer tube receiver extension 174. As shown in FIG. 10, between the buffer tube 132 and the front buffer tube receiver extension 174 is an end plate 184. The end plate 184 is used to secure a detent pin 186 and a release spring 188 between the end plate 184 and the front buffer tube receiver extension 174. The castle nut 180 is threaded onto the buffer tube 132 and is used to make sure the end plate 184 is held against the lower receiver front buffer tube receiver extension 174 and to prevent the unthreading of the buffer tube 132. There is a channel (not shown) in the buffer tube 132. The end plate 184 has a tab 185 that is received in the channel. The tab 185 received in the buffer tube channel prevents the buffer tube 132 from turning relative to the end plate 184.

The disclosed mount 10 is used to torque the castle nut 180 against the end plate 184 with the use of a castle nut wrench 190 and a torque wrench (not shown). As illustrated in FIG. 10, the castle nut 180 has castle nut notches 194 that receive wrench teeth 192 on the castle nut wrench 190. The teeth 192 engage the castle nut 180 on opposite sides of the castle nut, so the castle nut wrench 190 needs to be moved away along the central axis of the castle nut 180 for the castle nut wrench 190 to disengage the castle nut 180. The disclosed mount 10 helps to prevent this from happening while torquing the castle nut 180, as explained below.

The assembled buffer tube 132 and lower receiver 160 are inserted into the front 14 and back 26 pieces, with the pistol grip adapter 170 positioned between the side plates 25 and 27 at the back end 39 thereof, as shown in FIG. 11. The two mount pieces, 14 and 26, the two side plates 25 and 27, and the assembled buffer tube 132 and lower receiver 160 are then placed in the vise 145. Jaws 148 of the vise 145 grip and push together the side plates 25 and 27. This secures each of the legs 22 and 34 of the two pieces 14 and 26 and the pistol grip adapter 170 between the side plates 25 and 27, creating a steady unit that is now ready for a torque wrench for tightening the castle nut 180 against the end plate 184 to the required 40-foot pounds of torque. Once the castle nut wrench 190 is in place on the castle nut 180, the back piece 26 is positioned against the castle nut wrench 190, as shown in FIG. 11, thereby preventing the castle nut wrench 190 from slipping off the castle nut 180 while torquing the castle nut 180 with a torque wrench.

After torquing down the castle nut 180, it is customary to then stake part of the end plate 184 into at least two opposed castle nut notches 194. To do this, the buffer tube 132 is removed from the mount 10 and then reinserted into the mount 10. In this position, having the back piece 26 adjacent the castle nut 180 aids in stabilizing the receiver assembly while the staking occurs, as shown in FIG. 12.

The disclosed mount 10 provides several advantages. One of the principal advantages is that it allows for the secure mounting of the lower receiver 160 between the jaws 148 of the vise 145. When secured in the vise 145, the lower receiver 160 and buffer tube 132 are held tightly in three places: at the lower receiver rear pistol grip adapter 170 by the two spaced apart plates 25 and 27, at the front piece 14 and at the back piece 26. This secure holding of the lower receiver 160 and buffer tube 132 allows for the ready torquing of the castle nut 180 against the end plate 184 to the required 40 foot-pounds of torque by a torque wrench. After torquing down the castle nut 180, the mount 10 can be loosened in the vise 145, and then the buffer tube 132 can be turned and returned to within the front 14 and back 26 pieces, where the mount 10 is again tightened in the vise 145. In this position, the end plate 184 can be staked to the castle nut 180.

In conventional rifle mounts, torquing the castle nut is known to sometimes twist the buffer tube relative to the lower receiver or damage the buffer tube. This can result in misalignment of the buffer tube and the lower receiver, with the rifle stock attached to the buffer tube then not being in its right position. The disclosed mount 10, by providing three secure points of contact with the buffer tube 132 and lower receiver 160 when torquing the castle nut 180, together with having the back piece 26 by the castle nut 180, helps to prevent this undesired twisting.

Various other features of this disclosure are set forth in the following claims.

The invention claimed is:

1. A mount for a firearm assembly, the firearm assembly including a lower receiver comprising a rear pistol grip adapter and a front buffer tube receiver extension, and a buffer tube having a longitudinal cylindrical portion and a buffer tube radially extending flange, the mount comprising:

four independent planar pieces, the four independent pieces being two spaced apart side plates, a front piece having a front buffer tube receiving portion and a front leg, part of which is located between the two spaced apart side plates, and a back piece spaced apart from the front piece and having a back buffer tube receiving portion and a back leg, part of which is located between the two spaced apart side plates, the front receiving portion having a front buffer tube receiving opening adapted to receive the buffer tube, and the back receiving portion having a back buffer tube receiving opening adapted to receive the buffer tube, each receiving portion having at least one recess forming a buffer tube flange receiving opening.

2. The mount according to claim 1 wherein the back piece is movable along the spaced apart side plates.

3. The mount according to claim 1 wherein the spaced apart side plates have a notch therein that receives the front piece.

4. The mount according to claim 3 wherein the spaced apart side plates have outward extensions that form the notch and supports the sides of the front piece.

5. The mount according to claim 1 wherein the front piece is fixed to the spaced apart side plates.

6. A mount for a firearm assembly, the firearm assembly including a lower receiver comprising a rear pistol grip adapter and a front buffer tube receiver extension, and a buffer tube having a longitudinal cylindrical portion and a buffer tube radially extending flange, the mount comprising:

a bottom support member comprising two spaced apart side plates, a front piece having a front buffer tube receiving portion and a front leg, part of which is located between the two spaced apart side plates, and a back piece spaced apart from the front piece and having a back buffer tube receiving portion and a back leg part of which is located between the two spaced apart side plates, the front receiving portion having a front buffer tube receiving opening adapted to receive the buffer tube, the back receiving portion having a back buffer tube receiving opening adapted to receive the buffer tube, each receiving portion having at least one recess forming a buffer tube flange receiving opening, the bottom support member having a front end and a back end, the side plates having a front end and a back end, the front piece being at the front end and the back piece being at but spaced apart from the back end, so that the space between the side plates is adapted to receive the rear pistol grip adapter.

7. The mount according to claim 6 wherein the back piece is movable along the spaced apart side plates.

8. The mount according to claim 6 wherein the spaced apart side plates have a notch therein that receives the front piece.

9. The mount according to claim 8 wherein the spaced apart side plates have outward extensions that form the notch and supports the sides of the front piece.

10. The mount according to claim 6 wherein the front piece is fixed to the spaced apart side plates.

11. A mount for a firearm assembly, the firearm assembly including a lower receiver comprising a rear pistol grip adapter and a front buffer tube receiver extension, and a buffer tube having a longitudinal cylindrical portion and a buffer tube radially extending flange, the mount comprising:

a bottom support member, a front piece having a front buffer tube receiving portion held by the bottom support member, and a back piece spaced apart from the front piece and having a back buffer tube receiving portion held by the bottom support member, the front receiving portion having a front buffer tube receiving opening adapted to receive the buffer tube, the back receiving portion having a back buffer tube receiving opening adapted to receive the buffer tube each buffer tube receiving opening having at least one recess forming a buffer tube flange receiving opening, the bottom support having a front end and a back end, the front piece being at the front end and the back piece being at but spaced apart from the back end, and a space between the sides of the bottom support member at the back end and adapted to receive the rear pistol grip adapter.

12. The mount according to claim 1 wherein the back piece is movable along the bottom support member.

13. The mount according to claim 11 wherein the bottom support member has a notch therein that receives the front piece.

14. The mount according to claim 13 wherein the bottom support member has outward extensions that form the notch and supports the sides of the front piece.

15. The mount according to claim 11 wherein the front piece is fixed to the bottom support member.

* * * * *